United States Patent
Marupaduga

(10) Patent No.: US 11,930,459 B2
(45) Date of Patent: *Mar. 12, 2024

(54) DYNAMIC MODIFICATION OF ANTENNA BEAMFORMING FUNCTIONALITY

(71) Applicant: T-MOBILE INNOVATIONS LLC, Overland Park, KS (US)

(72) Inventor: Sreekar Marupaduga, Overland Park, KS (US)

(73) Assignee: T-Mobile Innovations LLC, Overland Park, KS (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/151,243

(22) Filed: Jan. 6, 2023

(65) Prior Publication Data

US 2023/0141889 A1 May 11, 2023

Related U.S. Application Data

(63) Continuation of application No. 17/101,695, filed on Nov. 23, 2020, now Pat. No. 11,582,705.

(51) Int. Cl.
*H04B 17/318* (2015.01)
*H04L 5/00* (2006.01)
(Continued)

(52) U.S. Cl.
CPC .......... *H04W 52/42* (2013.01); *H04B 17/318* (2015.01); *H04L 5/0098* (2013.01); *H04W 24/10* (2013.01)

(58) Field of Classification Search
None
See application file for complete search history.

(56) References Cited

U.S. PATENT DOCUMENTS

| | | | | |
|---|---|---|---|---|
| 2005/0265275 A1* | 12/2005 | Howard | ............... | H04B 7/0617 370/328 |
| 2016/0043792 A1* | 2/2016 | Jeong | .................. | H04B 7/0862 370/328 |

(Continued)

FOREIGN PATENT DOCUMENTS

| | | |
|---|---|---|
| WO | 2021/063783 A1 | 4/2021 |
| WO | 2021/188027 A1 | 9/2021 |

*Primary Examiner* — Scott M Sciacca
(74) *Attorney, Agent, or Firm* — Shook, Hardy & Bacon L.L.P.

(57) ABSTRACT

Methods and systems are provided for dynamically disabling beamforming functionality of one or more frequency bands. For example, a frequency band may have beamforming enabled. One or more user devices may be connected to the frequency band having beamforming enabled for access to a wireless telecommunications network. User devices connected with the frequency band may be at various locations of a network cell of the wireless telecommunications network (e.g., a cell center, middle cell, cell edge). Fading information may be received by one or more of the user devices connected with the frequency band. One or more fading channel measurements of the first frequency band may be above a threshold. In some embodiments, a fading channel measurement of the first frequency band is higher than another available frequency band having beamforming enabled. As such, beamforming of the first frequency band can be dynamically disabled.

20 Claims, 8 Drawing Sheets

(51) Int. Cl.
  *H04W 24/10* (2009.01)
  *H04W 52/42* (2009.01)

(56) References Cited

U.S. PATENT DOCUMENTS

| | | | |
|---|---|---|---|
| 2022/0377635 A1* | 11/2022 | Hviid | H04B 17/391 |
| 2023/0156822 A1* | 5/2023 | Zhou | H04W 74/0891 |
| | | | 370/329 |
| 2023/0163828 A1* | 5/2023 | Larsson | H04W 24/10 |
| | | | 375/267 |

* cited by examiner

DYNAMIC MODIFICATION OF ANTENNA BEAMFORMING FUNCTIONALITY

CROSS-REFERENCE TO RELATED APPLICATIONS

This application is a continuation of U.S. patent application Ser. No. 17/101,695, filed on Nov. 23, 2020, titled "Dynamic Modification of Antenna Beamforming Functionality." The aforementioned application is assigned or under obligation of assignment to the same entity as this application, and is incorporated in its entirety in this application by reference.

SUMMARY

The present disclosure is directed, in part, to dynamic antenna enablement comprising disablement of beamforming functionality based on band fading, substantially as shown in and/or described in connection with at least one of the figures, and as set forth more completely in the claims.

In brief and at a high level, this disclosure describes, among other things, methods, media, and systems for dynamically disabling beamforming functionality of a frequency band having at least one fading channel measurement above a particular threshold. For example, the frequency band already has beamforming enabled and has at least one user device connected to it for access to a wireless telecommunications network. The beamforming of the frequency band is dynamically disabled in response to determining that the at least one fading channel measurement is above the threshold. In embodiments, the user devices that were connected to the frequency band are reconnected to a different frequency band for access to a wireless telecommunications network.

This summary is provided to introduce a selection of concepts in a simplified form that are further described below in the detailed description. This summary is not intended to identify key features or essential features of the claimed subject matter, nor is it intended to be used in isolation as an aid in determining the scope of the claimed subject matter.

BRIEF DESCRIPTION OF THE DRAWINGS

The present technology is described in detail below with reference to the attached drawing figures, wherein.

DETAILED DESCRIPTION

Figure 1:
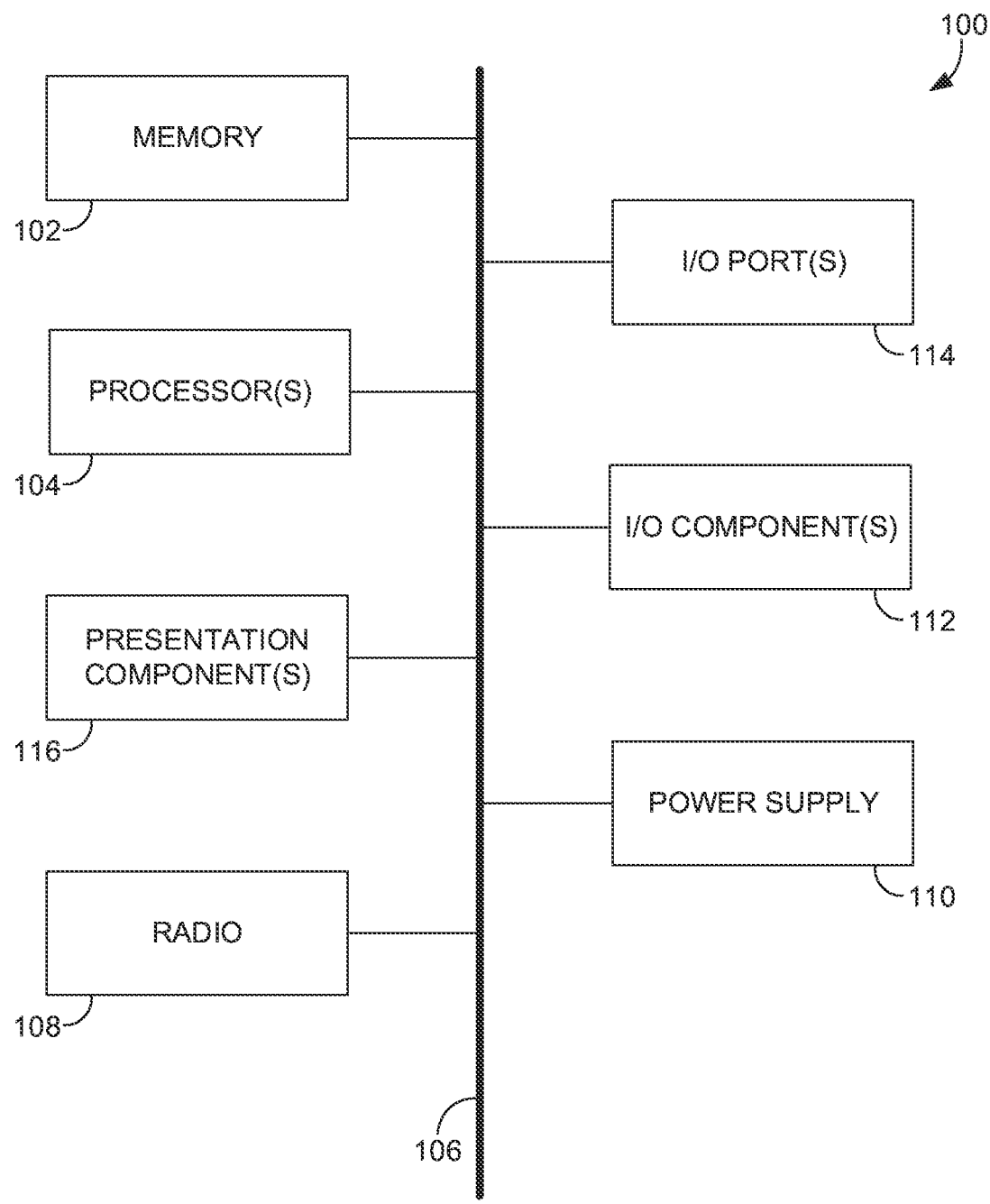
FIG. 1 depicts a diagram of an example computing environment suitable for use in implementations of the present disclosure.

The subject matter of embodiments of the present disclosure is described with specificity herein to meet statutory requirements. However, the description itself is not intended to limit the scope of this patent. Rather, it is contemplated that the claimed subject matter might be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Throughout this disclosure, several acronyms and shorthand notations are employed to aid the understanding of certain concepts pertaining to the associated system and services. These acronyms and shorthand notations are intended to help provide an easy methodology of communicating the ideas expressed herein and are not meant to limit the scope of embodiments described in the present disclosure. The following is a list of these acronyms:

3G Third-Generation Wireless Technology
4G Fourth-Generation Cellular Communication System
5G Fifth-Generation Cellular Communication System
CD-ROM Compact Disk Read Only Memory
CDMA Code Division Multiple Access
CQI Channel Quality Indicator
eNodeB Evolved Node B
gNodeB Next Generation Node B
GSM Global System for Mobile communications
DVD Digital Versatile Discs
EEPROM Electrically Erasable Programmable Read Only Memory
HSDPA High Speed Downlink Packet Access
LTE Long Term Evolution
MIMO Multiple Input Multiple Output
PC Personal Computer
PDA Personal Digital Assistant
RAM Random Access Memory
RF Radio-Frequency
ROM Read Only Memory
SINR Transmission-to-Interference-Plus-Noise Ratio
SMS Short Message Service
SPR Sector Power Ratio
TR Transmitting-Receiving
UE User Equipment
UMTS Universal Mobile Telecommunications Systems
WCDMA Wideband Code Division Multiple Access
WiMAX Worldwide Interoperability for Microwave Access Further, various technical terms are used throughout this description. An illustrative resource that fleshes out various aspects of these terms can be found in Newton's Telecom Dictionary, 31st Edition (2018).

Embodiments of the present technology may be embodied as, among other things, a method, system, or computer-program product. Accordingly, the embodiments may take the form of a hardware embodiment, or an embodiment combining software and hardware. An embodiment takes the form of a computer-program product that includes computer-useable instructions embodied on one or more computer-readable media.

Computer-readable media include both volatile and nonvolatile media, removable and non-removable media, and contemplate media readable by a database, a switch, and various other network devices. Network switches, routers, and related components are conventional in nature, as are means of communicating with the same. By way of example, and not limitation, computer-readable media comprise computer-storage media and communications media.

Computer-storage media, or machine-readable media, include media implemented in any method or technology for storing information. Examples of stored information include computer-useable instructions, data structures, program modules, and other data representations. Computer-storage media include, but are not limited to RAM, ROM, EEPROM, flash memory or other memory technology, CD-ROM, DVD, holographic media or other optical disc storage, magnetic cassettes, magnetic tape, magnetic disk storage, and other magnetic storage devices and may be considered transitory, non-transitory, or a combination of both. These memory components can store data momentarily, temporarily, or permanently.

Communications media typically store computer-useable instructions, including data structures and program modules, in a modulated data signal. The term "modulated data signal" refers to a propagated signal that has one or more of its characteristics set or changed to encode information in the signal. Communications media include any information-delivery media. By way of example but not limitation, communications media include wired media, such as a wired network or direct-wired connection, and wireless media such as acoustic, infrared, radio, microwave, spread-spectrum, and other wireless media technologies. Combinations of the above are included within the scope of computer-readable media.

By way of background, wireless telecommunication networks provide access for a user device (e.g., a UE) to access one or more network services. In some cases, the desired network service may be a telecommunication service. In conventional systems, beamforming enablement may be made based on network footprints, network performance of EUs in the network service, locations of the UEs in the network service, or the number of the UEs in the network service. For example, TR components of broadcast cells may emit network footprints having lower performance of some UEs in the network service. Sometimes, the network footprint is outside a designated coverage and may be overlapping with another network footprint. In conventional systems, beamforming adjustments have not been made using fading. Further, conventional systems have not disabled beamforming of a frequency band based on fading of the frequency band. Furthermore, disabling has not been determined based on the fading relative to a particular threshold.

Unlike conventional systems that don't consider fading as a factor to determine whether to disable beamforming, the present disclosure dynamically disables beamforming of a frequency band based on that frequency band's fading level being above a threshold. Some advantages from these determinations include improved UE channel quality, improved wireless network service, and improved connections. For example, if the frequency band has random fluctuations of a 5G wireless channel signal, and those fluctuations cause the fading level to surpass the threshold and cause faded beam power, the beamforming of the frequency band may be dynamically disabled and result in an improved connection without interference.

To illustrate, in one aspect, this disclosure describes, among other things, methods and systems for dynamically disabling beamforming functionality of a first frequency band. One or more nodes are each configured to wirelessly communicate with a user device in a geographic service area. One or more processors are configured to perform operations. For example, the first frequency band is determined to have beamforming enabled. Further, it is detected that the user device is connected to the first frequency band for access to a wireless telecommunications network. A first fading channel measurement of the first frequency band is determined to be above a threshold. Beamforming of the first frequency band is dynamically disabled in response to determining that the first fading channel measurement is above the threshold.

In another embodiment, this disclosure describes methods and systems for one or more non-transitory computer-readable media having computer-executable instructions embodied thereon that, when executed, perform a method for dynamically disabling beamforming functionality of a first frequency band. It is determined that the first frequency band and a second frequency band have beamforming enabled. Additionally, it is detected that a user device is connected to the first frequency band for access to a wireless telecommunications network. In addition, it is determined that a first fading channel measurement of the first frequency band and that it is above a threshold. It is also determined that a second fading channel measurement of the second frequency band and that it is at or below the threshold. Further, beamforming of the first frequency band is dynamically disabled.

In yet another embodiment, this disclosure describes methods and systems for dynamically disabling beamforming functionality of a first frequency band. It is determined that the first frequency band has beamforming enabled. It is also determined that a user device (1) is connected to the first frequency band for access to a wireless telecommunications network and (2) is capable of connecting to a second frequency band having a higher frequency band than the first frequency band. Further, it is determined that a first fading channel measurement of the first frequency band and that it is above a threshold. Furthermore, beamforming of the first frequency band is dynamically disabled.

Turning to FIG. 1, a diagram is depicted of an exemplary computing environment suitable for use in implementations of the present disclosure. In particular, the exemplary computer environment is shown and designated generally as computing device 100. Computing device 100 is but one example of a suitable computing environment and is not intended to suggest any limitation as to the scope of use or functionality of the invention. Neither should computing device 100 be interpreted as having any dependency or requirement relating to any one or combination of components illustrated. In aspects, the computing device 100 may be a UE, WCD, or other user device, capable of two-way wireless communications with an access point. Some non-limiting examples of the computing device 100 include a cell phone, tablet, pager, personal electronic device, wearable electronic device, activity tracker, desktop computer, laptop, PC, and the like.

The implementations of the present disclosure may be described in the general context of computer code or machine-useable instructions, including computer-executable instructions such as program components, being executed by a computer or other machine, such as a personal data assistant or other handheld device. Generally, program components, including routines, programs, objects, components, data structures, and the like, refer to code that performs particular tasks or implements particular abstract data types. Implementations of the present disclosure may be practiced in a variety of system configurations, including handheld devices, consumer electronics, general-purpose computers, specialty computing devices, etc. Implementations of the present disclosure may also be practiced in distributed computing environments where tasks are performed by remote-processing devices that are linked through a communications network.

With continued reference to FIG. 1, computing device 100 includes bus 106 that directly or indirectly couples the following devices: memory 102, processor(s) 104, radio(s) 108, power supply 110, input/output (I/O) component(s) 112, I/O port(s) 114, and presentation component(s) 116. Bus 106 represents what may be one or more busses (such as an address bus, data bus, or combination thereof). Although the devices of FIG. 1 are shown with lines for the sake of clarity, in reality, delineating various components is not so clear, and metaphorically, the lines would more accurately be grey and fuzzy. For example, one may consider a presentation component such as a display device to be one of I/O component(s) 112. Also, processors, such as the processor(s) 104, have memory. The present disclosure hereof recognizes that such is the nature of the art, and reiterates that FIG. 1 is merely illustrative of an exemplary computing environment that can be used in connection with one or more implementations of the present disclosure. Distinction is not made between such categories as "workstation," "server," "laptop," "handheld device," etc., as all are contemplated within the scope of FIG. 1 and refer to "computer" or "computing device."

Computing device 100 typically includes a variety of computer-readable media. Computer-readable media can be any available media that can be accessed by computing device 100 and includes both volatile and nonvolatile media, removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules or other data. Additionally, computer storage media includes RAM, ROM, EEPROM, flash memory or other memory technology, CD-ROM, digital versatile disks (DVD) or other optical disk storage, magnetic cassettes, magnetic tape, magnetic disk storage or other magnetic storage devices. Computer storage media does not comprise a propagated data signal.

Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 102 includes computer-storage media in the form of volatile and/or nonvolatile memory. Memory 102 may be removable, nonremovable, or a combination thereof. Exemplary memory includes solid-state memory, hard drives, optical-disc drives, etc. Computing device 100 includes processor(s) 104 that read data from various entities such as bus 106, memory 102 or I/O component(s) 112. Presentation component(s) 116 presents data indications to a person or other device. Exemplary presentation component(s) 116 include a display device, speaker, printing component, vibrating component, etc. I/O port(s) 114 allow computing device 100 to be logically coupled to other devices including I/O component(s) 112, some of which may be built in computing device 100. Illustrative I/O component(s) 112 include a microphone, joystick, game pad, satellite dish, scanner, printer, wireless device, etc.

Radio(s) 108 represents a radio that facilitates communication with a wireless telecommunications network. In aspects, the radio(s) 108 utilizes one or more transmitters, receivers, and antennas to communicate with the wireless telecommunications network on a first downlink/uplink channel. Though only one radio is depicted in FIG. 1, it is expressly conceived that the computing device 100 may have more than one radio, and/or more than one transmitter, receiver, and antenna for the purposes of communicating with the wireless telecommunications network on multiple discrete downlink/uplink channels, at one or more wireless nodes. Illustrative wireless telecommunications technologies include CDMA, GPRS, TDMA, GSM, and the like. Radio(s) 108 might additionally or alternatively facilitate other types of wireless communications including Wi-Fi, WiMAX, LTE, or other VoIP communications. As can be appreciated, in various embodiments, radio(s) 108 can be configured to support multiple technologies and/or multiple radios can be utilized to support multiple technologies. A wireless telecommunications network might include an array of devices, which are not shown so as to not obscure more relevant aspects of the invention. Components such as a base station, a communications tower, or even access points (as well as other components) can provide wireless connectivity in some embodiments.

Figure 2:
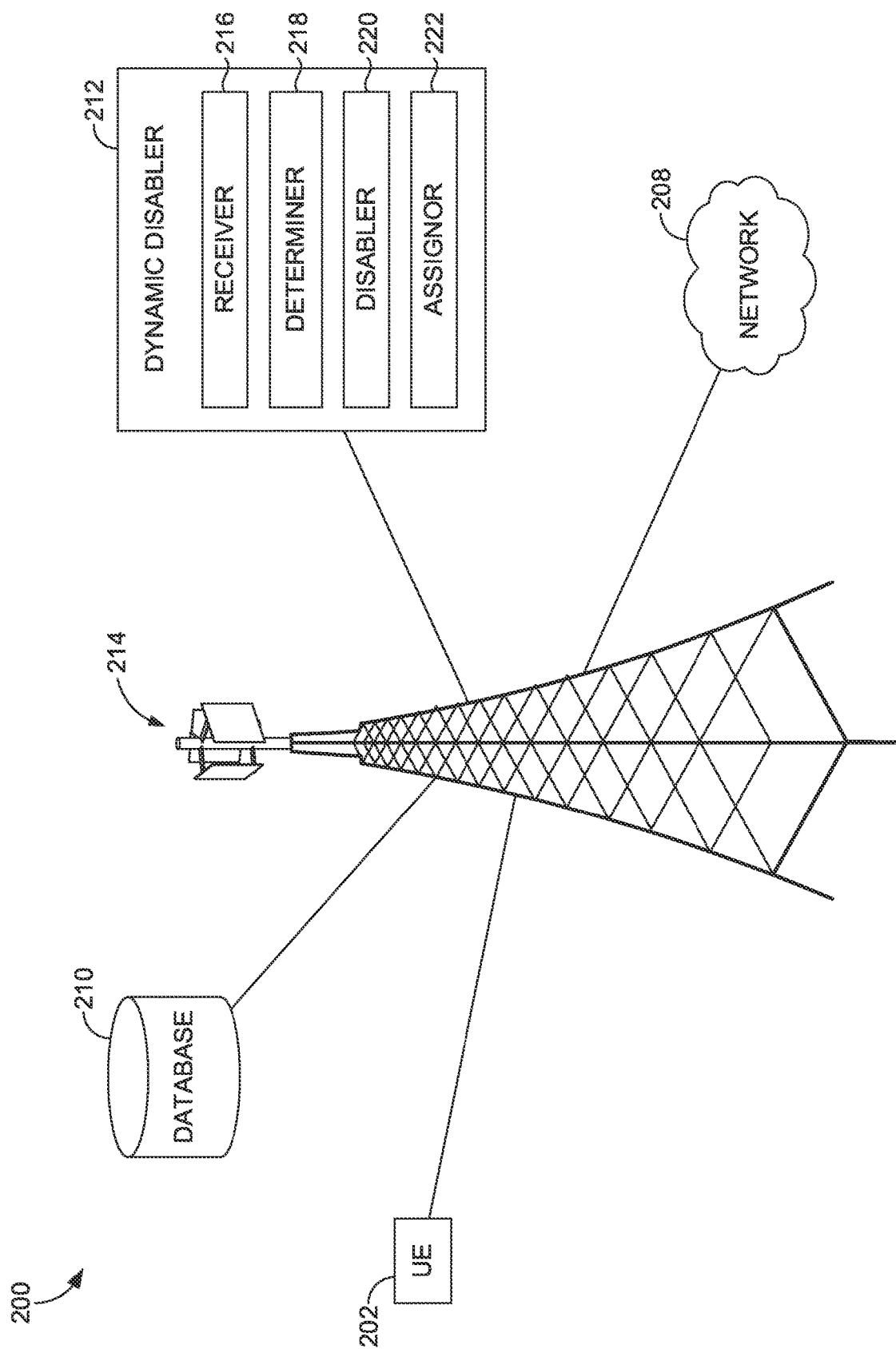
FIG. 2 illustrates a diagram of an example environment comprising a dynamic disabler and in which implementations of the present disclosure may be employed.

Turning now to FIG. 2, network environment 200 is an exemplary network environment in which implementations of the present disclosure may be employed. Network environment 200 is one example of a suitable network environment and is not intended to suggest any limitation as to the scope of use or functionality of the present disclosure. Neither should the network environment be interpreted as having any dependency or requirement relating to any one or combination of components illustrated.

Network environment 200 includes UE 202 (network environment 200 may contain more UEs), network 208, database 210, dynamic disabler 212, and cell site 214. In the network environment 200, UE 202 may take on a variety of forms, such as a PC, a user device, a smart phone, a smart watch, a laptop computer, a mobile phone, a mobile device, a tablet computer, a wearable computer, a PDA, a server, a CD player, an MP3 player, a global positioning system (GPS) device, a video player, a handheld communications device, a workstation, a router, an access point, and any combination of these delineated devices, or any other device that communicates via wireless communications with a cell site 214 in order to interact with network 208, which may be a public or a private network.

In some aspects, the UE 202 corresponds to a user device or a computing device. For example, the user device may include a display(s), a power source(s) (e.g., a battery), a data store(s), a speaker(s), memory, a buffer(s), a radio(s) and the like. In some implementations, the UE 202 comprises a wireless or mobile device with which a wireless telecommunication network(s) may be utilized for communication (e.g., voice and/or data communication). In this regard, the user device may be any mobile computing device that communicates by way of a wireless network, for example, a 3G, 4G, 5G, LTE, CDMA, or any other type of network.

In some cases, the UE 202 in network environment 200 may optionally utilize network 208 to communicate with other computing devices (e.g., a mobile device(s), a server(s), a personal computer(s), etc.) through cell site 214. The network 208 may be a telecommunications network(s), or a portion thereof. A telecommunications network might include an array of devices or components (e.g., one or more base stations), some of which are not shown. Those devices or components may form network environments similar to what is shown in FIG. 2, and may also perform methods in accordance with the present disclosure. Components such as terminals, links, and nodes (as well as other components) may provide connectivity in various implementations. Network 208 may include multiple networks, as well as being a network of networks, but is shown in more simple form so as to not obscure other aspects of the present disclosure.

Network 208 may be part of a telecommunication network that connects subscribers to their service provider. In aspects, the service provider may be a telecommunications service provider, an internet service provider, or any other similar service provider that provides at least one of voice telecommunications and data services to UE 202 and any other UEs. For example, network 208 may be associated with a telecommunications provider that provides services (e.g., LTE) to the UE 202. Additionally or alternatively, network 208 may provide voice, SMS, and/or data services to user devices or corresponding users that are registered or subscribed to utilize the services provided by a telecommunications provider. Network 208 may comprise any communication network providing voice, SMS, and/or data service(s), using any one or more communication protocols, such as a 1× circuit voice, a 3G network (e.g., CDMA, CDMA2000, WCDMA, GSM, UMTS), a 4G network (WiMAX, LTE, HSDPA), or a 5G network. The network 208 may also be, in whole or in part, or have characteristics of, a self-optimizing network.

In some implementations, cell site 214 is configured to communicate with the UE 202 that is located within the geographical area defined by a transmission range and/or receiving range of the radio antennas of cell site 214. The geographical area may be referred to as the "coverage area" of the cell site or simply the "cell," as used interchangeably hereinafter. Cell site 214 may include one or more base stations, base transmitter stations, radios, antennas, antenna arrays, power amplifiers, transmitters/receivers, digital signal processors, control electronics, GPS equipment, and the like. In particular, cell site 214 may be configured to wirelessly communicate with devices within a defined and limited geographical area. For the purposes of the present disclosure, it may be assumed that it is undesirable and unintended by the network 208 that the cell site 214 provide wireless connectivity to the UE 202 when the UE 202 is geographically situated outside of the cell associated with cell site 214.

In an exemplary aspect, the cell site 214 comprises a base station that serves at least one sector of the cell associated with the cell site 214, and at least one transmit antenna for propagating a signal from the base station to one or more of the UE 202. In other aspects, the cell site 214 may comprise multiple base stations and/or multiple transmit antennas for each of the one or more base stations, any one or more of which may serve at least a portion of the cell. In some aspects, the cell site 214 may comprise one or more macro cells (providing wireless coverage for users within a large geographic area) or it may be a small cell (providing wireless coverage for users within a small geographic area). For example, macro cells may correspond to a coverage area having a radius of approximately 1-15 miles or more, the radius measured at ground level and extending outward from an antenna at the cell site. In another example, a small cell may correspond to a coverage area having a radius of approximately less than three miles, the radius measured at ground level and extending outward from an antenna at the cell site.

As shown, cell site 214 is in communication with the dynamic disabler 212, which comprises a receiver 216, a determiner 218, a disabler 220, and an assignor 222. Beginning with receiver 216, the receiver 216 may retrieve data from the UE 202, the network 208, the database 210, and the cell site 214. In some embodiments, the receiver 216 may receive various information from UEs and from particular frequency bands. For example, receiver 216 may receive UE channel conditions at various times. Continuing the example, the cell site 214 may receive channel state feedback via a feedback reporting procedure. The feedback may include antenna configuration, signal-to-noise ratio, the type of the UE receiver, etc. The receiver 216 may receive UE reports based on downlink transmissions from the cell site 214 that were transmitted via uplink channels at predetermined time intervals. The receiver 216 may receive these reports from cell site 214.

Further, the receiver 216 may receive fading information comprising signal strength deterioration. A frequency band may experience fading via random fluctuations of a 5G wireless channel signal due to atmospheric turbulence, for example. Atmospheric turbulence may cause frequency-nonselective fades in beam power when beamforming is enabled. The receiver 216 may receive fading duration information, such as the time that the fading occurred, the time that the fading stopped, and the length of time the signal was deteriorated before returning to a more acceptable level. Because fading may result in UEs consuming more battery power, the receiver 216 may also receive battery power information from UEs. In some embodiments, receiver 216 may receive information relating to attenuation in a wideband MIMO system that experiences frequency selective fading characterized by different attenuation amounts across the system bandwidth. Further, receiver 216 may receive information relating to inter-symbol interference (symbols in received signals acting as distortion to subsequent symbols) caused by the frequency selective fading. In some embodiments, receiver 216 may receive information relating to each spatial subchannel experiencing frequency selective fading.

In some embodiments, receiver 216 may access information related to UE self-interference and transmit power information. For example, when the channel fades down, the power may increase more rapidly than the channel due to increased self-interference. The receiver 216 may receive information about the amount of power increase and a length of excess power usage (e.g. the UE may take a long time to decrease excess power usage). In some embodiments, receiver 216 may receive information relating to spatial processing (e.g. based on a channel correlation matrix inversion technique or a minimum mean square error technique) of a flat fading channel. Additionally, receiver 216 may receive information comprising scattering and power decay with distance between transmitter and receiver and channel estimations of the effects these will have on the channel.

Furthermore, additional data the receiver 216 may access includes, but is not limited to, location information of the UE 202 and other CQI. Location information may comprise GPS or other satellite location services, terrestrial triangulation, an access point location, or any other means of obtaining coarse or fine location information. The location information may indicate geographic location(s) of one or more of a user device, an antenna, a cell tower, a cell site, and/or a coverage area of a cell site, for example. The other CQI may indicate the quality of communications between one or more user devices and a particular cell site. For example, CQI may quantify how communications are traveling over a particular communication channel quality, thus indicating when communications performance is negatively impacted or impaired. As such, channel quality information may indicate a realized uplink and/or downlink transmission data rate of a cell site and/or each of one or more user devices communicating with the cell site, observed SINR and/or signal strength at the user device(s), or throughput of the connection between the cell site and the user device(s). Location and CQI may take into account the UEs' capability, such as the number of antennas of the user device and the type of receiver used by the user device for detection. The receiver 216 may also be configured to receive information from cell sites other than cell site 214 or other processors and/or servers.

The receiver 216 may also access SPR data. SPR data may be affected by orientation (i.e., how the service coverage area has been partitioned into sectors), electrical tilt, mechanical tilt, carrier band associated with an antenna, technical operating specifications of an antenna, manufacturing and materials of an antenna, environmental conditions (i.e., weather, heat, wear and tear), and power supplied to an antenna, for example. Carrier bands may refer to spectrums in any of the low band (e.g., Band 71/600 MHz, 700 MHz), the mid band (e.g., PCS, AWS1/2/3/4), and the high band (e.g., WCS/2.3 GHz, EBS/BRS 2.5 GHz, 24 GHz, 29 GHz, 29 GHz, and 39 GHz spectrums, and 5G mobile network bands). Further, SPR for an antenna may be calculated using RF radiation patterns. For example, the SPR of the antenna accounts for the power of its undesired RF signal relative to the power of the desired RF signal. The SPR of the antenna quantifies the amount of power of the undesired RF radiation contributed by the antenna to areas relative to the amount of power of the desired RF radiation in a sector of the antenna. Due to spillover among various antennas, certain areas experience the presence of interference and noise.

In addition, receiver 216 may receive information relating to fast and slow fading. Fast fading occurs when coherence time of a channel is small relative to delay. For example, amplitude and phase change that the channel imposes is varying considerably over a period of use. The coherence time comprises a measure of the minimum time required for the magnitude change or phase change of the channel to become uncorrelated from its previous value. Fast fading may result due to high Doppler spread and coherence time being less than a symbol period. Slow fading may occur due to low Doppler spread and impulse response changes that are slower than a transmitted signal. Accordingly, receiver 216 may receive information about Doppler spread, coherence time, symbol periods, changes to impulse responses, mobility, signal path change, shadowing, instances of physical obstructions, constructive interference patterns, destructive interference patterns, and so forth.

Turning to 218, the determiner 218 may determine that one or more frequency bands are beamforming enabled (e.g. having beam energy concentrated in a certain direction by using a weighting factor) via the base station. For example, a transmitter and receiver may each perform beamforming based on channel state information in a closed-loop MIMO scheme. In some embodiments, 2D or 3D beamforming is supported. In some embodiments, sector-specific elevation beamforming (e.g., adaptive control using vertical pattern beamwidth and/or downtilt), improved sectorization in vertical domain, and UE-specific elevation beamforming may be supported. In some embodiments, the beamforming comprises a dual layer beamforming offering up to two spatially multiplexed data layers with beamforming across co-polar (correlated) antenna arrays for each layer. In some embodiments, antenna configurations will benefit from an increase in power received at the UE on the downlink from beamforming gain available from a doubling of array aperture. In some embodiments, grating lobes may spill-over into adjacent sectors causing some increase in inter-sector interference. In some embodiments, determiner 218 determines a beam direction angular deviation (e.g. by using a ratio of receiving energy of a differential beam to receiving energy of a sum beam).

In some embodiments, determiner 218 determines or detects that a UE is connected to a frequency band for access to a wireless telecommunications network. This may be detected via UE transmission of data on an uplink. This may also be detected by using beam configuration information comprising indication information indicating whether a UE uses differential beamforming transmitting mode, beam width used by the UE to transmit a preamble sequence, beam width used by the UE to transmit subsequent data, UE beam scanning cycle, and base station beam scanning cycle. In some embodiments, determiner 218 may determine the cell site 214 received a signal from a UE in a differential beamforming receiving mode or a receiving mode that uses sum beam weight coefficients as beamforming weight coefficients. In some embodiments, UE terminals support two antennas. In other embodiments, the UE terminals support more than two spectrum bands simultaneously (e.g. though a joint optimization approach). In some embodiments, a UE beam direction angular deviation (e.g. by using received energy of the differential beam and energy of the sum beam transmitted by the UE) is determined.

In some embodiments, determiner 218 determines that a fading channel measurement of the frequency band is above a threshold. The fading channel measurement may comprise a signal measurement of a MIMO multipath fading channel. The fading channel measurement may be determined using channel state feedback information (e.g. UE reports to the base station), such as channel quality indicator accounting for signal-to-noise ratio, antenna configuration, UE receiver type, etc. The fading channel measurement may be taken over a discontinuous channel and may comprise an average maximum power of the channel, or it may be taken over a continuous channel and may comprise an average power. In some embodiments, the fading channel measurement may be determined using a fading average (linear) power and a fading amplitude. The fading channel measurement may also take into consideration channel capacity of spatial-multiplexing MIMO and Orthogonal Space Time block coded MIMO. Further, the fading channel measurement may also consider channel-error for carrier-to-noise ratio.

In some embodiments, the fading channel measurement may be determined based on a Rayleigh fading model or a Rician fading model. Further, fading conditions may comprise Gaussian, Weibull, Rayleigh, and Nakagami-m fading. Continuing the example, the fading channel measurement may comprise a low signal-to-noise ratio performance of a MIMO system under a fading condition with respect to a minimum normalized energy per information bit and wideband slope. In some embodiments, the fading channel measurement may be taken for a Rayleigh fading condition using a feedback channel equalization technique by estimating a fading channel gain. Further, the measurement may be performed by direct use of detected data digits in a decision-directed mode or by exploiting a reference signal.

In some embodiments, the threshold may be determined by the determiner 218. In some embodiments, the threshold is predetermined based on a channel state information report. In some embodiments, the threshold is predetermined by an operator based on a location of the user device and historical data of other user devices. The threshold may vary depending on the frequency that the fading channel measurement is taken, the type of fading condition, or the type of MIMO system. In some embodiments, the threshold may include a level of flat fading of an entire bandwidth of a frequency band. In some embodiments, the threshold is determined based on correlation properties of a fading wireless channel and noise over time. In some embodiments, the threshold is determined based on an impact of the transmission of data streams from the base station to a UE.

Turning to 220, the disabler 220 may dynamically disable beamforming a frequency band in response to determining that the fading channel measurement is above the threshold. In some embodiments, beamforming may be disabled for more than one frequency band. In some embodiments, disabling of the beamforming occurs automatically in response to determining that the fading channel measurement is above the threshold. In some embodiments, disabling of the beamforming occurs in response to determining a first fading channel measurement of a first frequency band is above the threshold and that a second fading channel measurement of a second frequency band is at or below the threshold. In some embodiments, more than two fading channel measurements are determined before disabling the beamforming.

Turning to 222, the assignor 222 may dynamically connect a UE that was connected to the frequency band having the fading channel measurement above the threshold to a second frequency band having a fading channel measurement at or below the threshold. In some embodiments, the UE connected to the second frequency band may have access to a wireless telecommunications network that it was accessing when it was connected to the frequency band. In some embodiments, the UE connected to the second frequency band may have access to a different wireless telecommunications network that it was accessing when it was connected to the frequency band. In some embodiments, the assignor 222 may dynamically connect a UE that was connected to the frequency band having the fading channel measurement above the threshold to a second frequency band having a lowest fading channel measurement compared to other available frequency bands.

Figure 3:
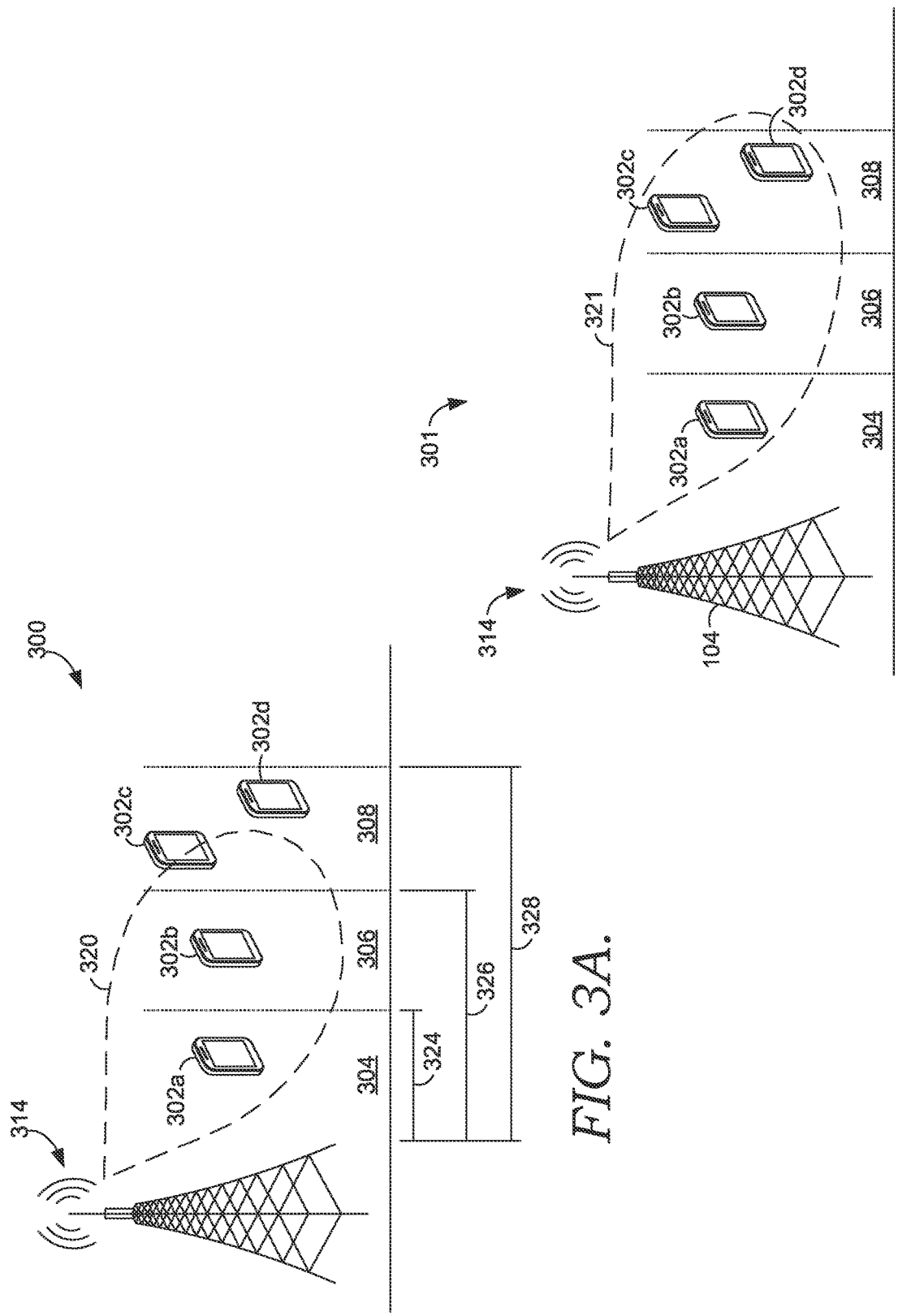
FIGS. 3A-3B illustrate a diagram of an example environment comprising frequency bands in which implementations of the present disclosure may be employed.

Turning now to FIGS. 3A-3B, dynamically disabled beamforming network 300 and beamforming network 301 comprise UEs 302a-302d, cell center 304, middle cell 306, cell edge 308, cell site 314, beam 320, beam 321, a first distance 324 between the base station of the cell site 214 and an outer boundary of the cell center 304, a second distance 326 between the base station of the cell site 214 and an outer boundary of the middle cell 306, and a third distance 328 between the base station of the cell site 214 and an outer boundary of the cell edge 308. FIG. 3A depicts a network after disabling beamforming and FIG. 3B depicts the network prior to disabling the beamforming. Although FIGS. 3A-3B depict the cell center 304, the middle cell 306, and the cell edge 308 extending from the base station in only one direction, a network cell typically extends 360 degrees around the base station. Accordingly, the cell center 304, the middle cell 306, and the cell edge 308 also may extend from the base station in 360 degrees (the cell center 304 may surround the base station, the middle cell 306 may surround the cell center 304, and the cell edge 308 may surround the middle cell 306 to form a perimeter of the entire network cell).

Further, location data indicating a distance between the base station of the cell site 314 and the UEs 302a-302d (or coordinates of a UE from which a distance is determined) may be used to classify the location of each of the UEs 302a-302d into the cell center 304, the middle cell 306, or the cell edge 308. Alternatively, the cell center 304, the middle cell 306, and the cell edge 308 may be defined by the geographical coordinates they cover, which may be compared to the location data indicating coordinates of the UEs 302a-302d to determine the region in which each of the UEs 302a-302d are located. Additionally, the location data received may not directly provide a specific location of one of the UEs 302a-302d but, instead, may be data indicating a signal quality for a particular one of the UEs 302a-302d. Additionally, the signal quality may be used to determine an approximate distance from the base station for classification into one of the cell center 304, the middle cell 306, or the cell edge 308 with UEs 302a-302d having lower signal qualities being classified as being in cell edge 308.

Fading channel measurements for the cell center 304, the middle cell 306, or the cell edge 308 within a network cell may vary based on particular factors. In one embodiment, a type of geographical environment in which the network cell is located may affect the fading channel measurement of the cell center 304, the middle cell 306, or the cell edge 308. For example, in urban environments, network cells are generally closer together, which increases the possibility of interference with neighboring cells. As such, a network cell within an urban environment may have a narrower cell edge 308 compared to a network cell within a suburban environment having a lower density of network cells.

In some embodiments, dynamically disabling beamforming (e.g. network 301 to network 300) may comprise an adjustment to one or more beam weights of beam 321 at full-power broadcast to result in a less than full-power broadcast beamforming. Continuing the example, the adjustment to the one or more beam weights may depend on a weighting pattern of the beams of beam 321 before the adjustment is made. For example, if the base station at cell site 314 in network 301 produces beam 321 servicing the cell center 304, the middle cell 306, and the cell edge 308 using four beams in a tapered pattern in which two middle beams are weighted at 1.0 (or 100%), and the other two outside beams are weighted at 1.0 (or 100%), the two outside beams may be adjusted from 1.0 to 0.5 to disable beamforming.

In some embodiments, dynamically disabling beamforming may comprise providing a wireless telecommunications network by providing the service through a non-full-powered beamforming scheme, such as tapered beamforming with a tapered weighting pattern. For example, tapered beamforming may occur when the beams within the beam 321 use different signal weights. In some tapered beamforming configurations, one or more beams may still be weighted to achieve a maximum signal strength, but at least one beam may be weighted to a less than maximum signal strength. Accordingly, the signal weight for one or more beams may be adjusted to less than maximum signal strength. In embodiments, the particular adjustments to be made may depend on the non-full-power weighting pattern that the base station will use when not implementing full-power broadcast beamforming. The weighting pattern may be the same pattern used immediately before full-power broadcast beamforming was enabled. In other embodiments, the weighting pattern may be a different pattern used immediately before full-power broadcast beamforming was enabled.

Figure 4:
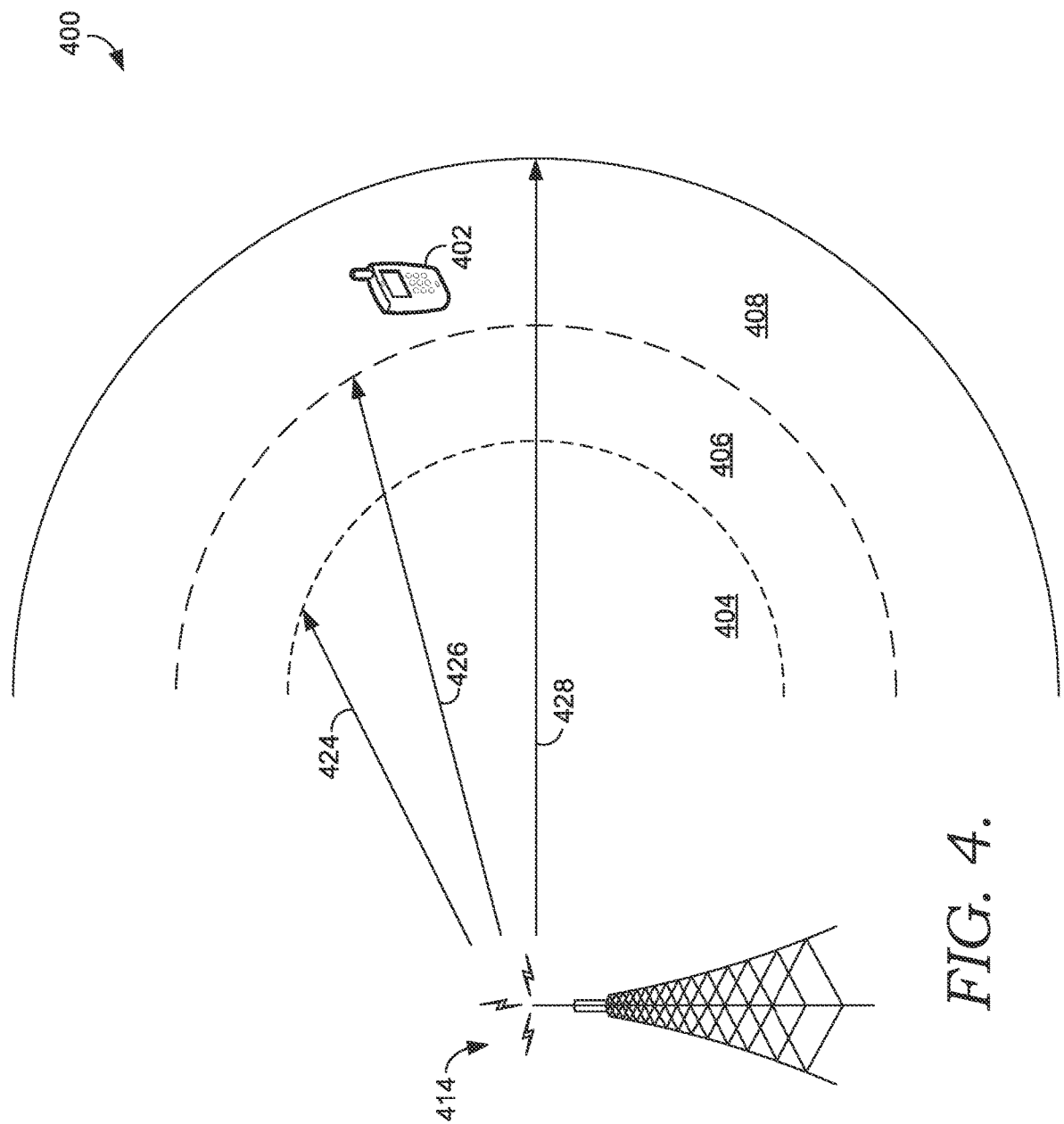
FIG. 4 illustrates a diagram of an exemplary network environment in which implementations of the present disclosure may be employed.

Turning now to FIG. 4, diagram 400 provides example propagation distances of frequency channels in various frequency bands radiated by an eNodeB. For example, diagram 400 depicts a UE 402, a cell center 404, a middle cell 406, a cell edge 408, a cell site 414, a first frequency band 424, a second frequency band 426, and a third frequency band 428. In some embodiments, the first frequency is an 800 MHz band, the second frequency band is a 1.9 GHz band, and the third frequency band is a 2.5 GHz band, as radiated by an eNodeB. Frequency channels in other frequency bands are possible in other embodiments.

As depicted, frequency channels of higher bands (e.g., the 1.9 GHz band and the 2.5 GHz band) may not radiate as far as frequency channels of low bands (e.g., the 800 MHz band), because these higher frequency bands may be more susceptible to attenuation by air-interface obstructions (e.g. buildings or trees). In some embodiments, the UE 402 operates on a frequency channel of a low frequency band. Continuing the example, UE 402 may be able to stay within coverage of the frequency channel of the low frequency band even when the UE 402 moves out of coverage of the frequency channels of the higher frequency bands. As such, when traveling at high speeds, operating on a low-frequency band may help the UE 402 to avoid frequent handoffs and improve user experience.

In some embodiments, the base station of the cell site 414 may instruct the UE 402 to use a frequency channel in a particular frequency band by transmitting the UE 402 a message on an overhead downlink channel that specifies the frequency channel and the frequency band. In one example, the base station of the cell site 414 may invoke an inter-frequency handover by transmitting, to the UE 402, an inter-frequency handover directive specifying a new frequency band to use. In other embodiments, other ways of instructing UE 402 to use a frequency channel in a particular frequency band are possible as well.

Figure 5:
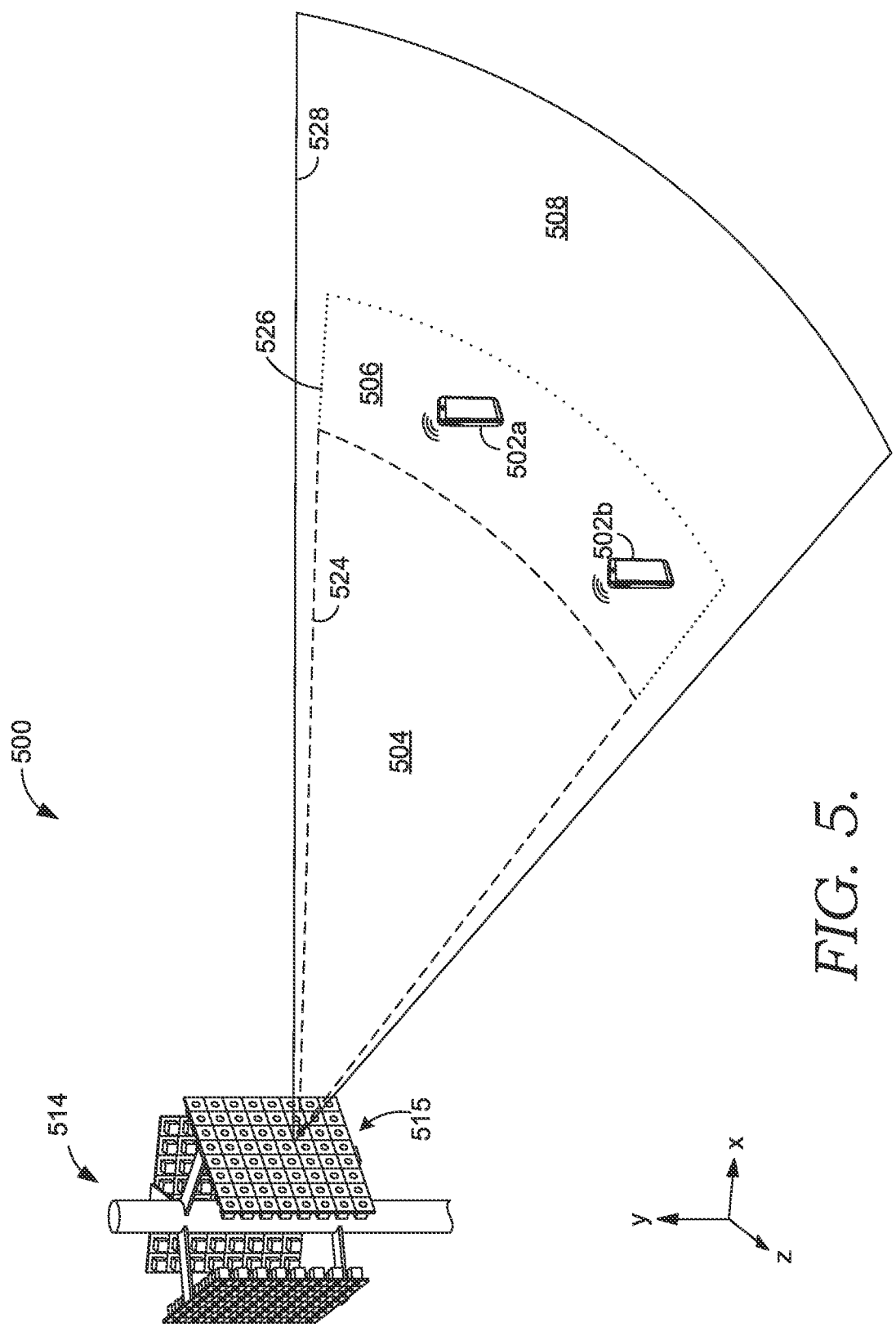
FIG. 5 illustrates a diagram of an example beamforming environment in which implementations of the present disclosure may be employed.

Turning now to FIG. 5, system 500 comprises cell site 514 that serves a plurality of UEs 502a-502b with wireless communication services. The cell site 514 may comprise an antenna array 515, which may further comprise a plurality of nodes. Each of the plurality of nodes may transmit one or more wireless signals according to a discrete wireless communication protocol. That is, a first node may communicate with one or more UEs according to a first protocol and a second node may communicate with one or more UEs according to a second protocol, wherein the first protocol and the second protocol are different. The one or more wireless signals emitted by the first node may be said to create a first node coverage footprint 524 that covers area 504 when beamforming is disabled. In embodiments, when beamforming of the first node footprint is enabled, the first node footprint has beamforming enabled footprint 526 that also covers additional area 506. Additionally, the one or more wireless signals emitted by the second node may create a second node coverage footprint 528 that covers additional area 508. In aspects, the first node and the second node may at least partially serve a common sector (i.e., the first node coverage footprint and the second node coverage footprint may at least partially overlap and make up a portion of an area served by the cell site 514).

The system 500 may comprise UEs 502a-502b each configured to wirelessly communicate with either the first node according to the first protocol, or with the second node according to the first protocol or the second protocol. For example, each of the UEs 502a-502b may be communicating or able to communicate with the first node according to the first protocol when beamforming is enabled. Other UEs (not depicted) may also be communicating with the first node or the second node. In embodiments, the UEs 502a-502b connected to the first node, which is beamforming enabled, may experience fading that is above a threshold. In this example, one of the UEs 502a-502b may experience poor quality of service or a connection drop. In response to a determination that the fading is above a threshold, beamforming may be dynamically disabled and the UEs 502a-502b may dynamically connect to the second node coverage footprint 528 according to the first protocol or the second protocol.

Figure 6:
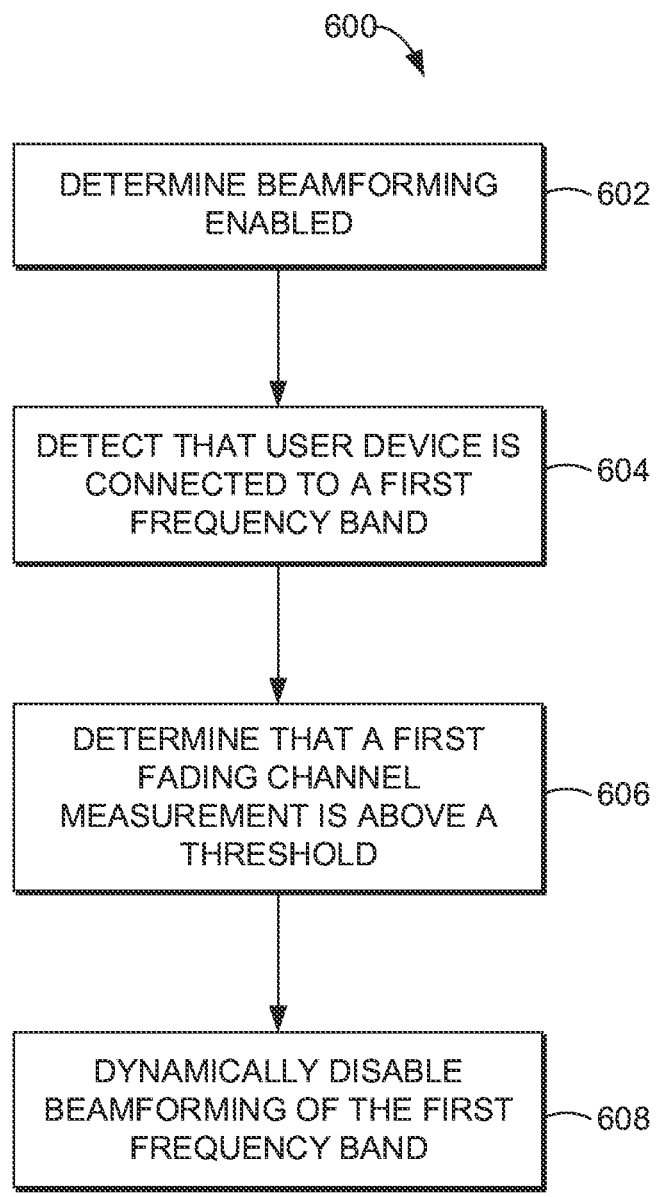
FIG. 6 illustrates an example flowchart in which implementations of the present disclosure may be employed.

Turning now to FIG. 6, flow diagram 600 comprises block 602, wherein a determination may be made that a first frequency band has beamforming enabled. At block 604, a detection may be made that a user device is connected to the first frequency band for access to a wireless telecommunications network. Further, at block 606, a determination may be made that a first fading channel measurement of the first frequency band is above a threshold. The threshold may be predetermined by an operator based on a location of the user device and historical data of other user devices. In some embodiments, the first fading channel measurement is measured using a model that depends on a time difference between input and output. In another embodiment, the first fading channel measurement is measured at a receiving end of the user device for a duration of time. In yet another embodiment, the first fading channel measurement is measured using a signal-to-noise ratio, a configuration of an antenna corresponding to the first frequency band, and a receiver type of the user device.

At block 608, in response to determining that the first fading channel measurement is above the threshold, beamforming of the first frequency band is dynamically disabled. In some embodiments, in response to dynamically disabling beamforming of the first frequency band, the user device may be dynamically connected to a second frequency band that has a second fading channel measurement at or below the threshold. In another embodiment, prior to dynamically disabling beamforming of the first frequency band, a determination may be made that the second frequency band is beamforming enabled and has the second fading channel measurement at or below the threshold. In some embodiments, dynamically connecting the user device to the second frequency band results in access to the wireless telecommunications network or access to a second wireless telecommunications network.

Figure 7:
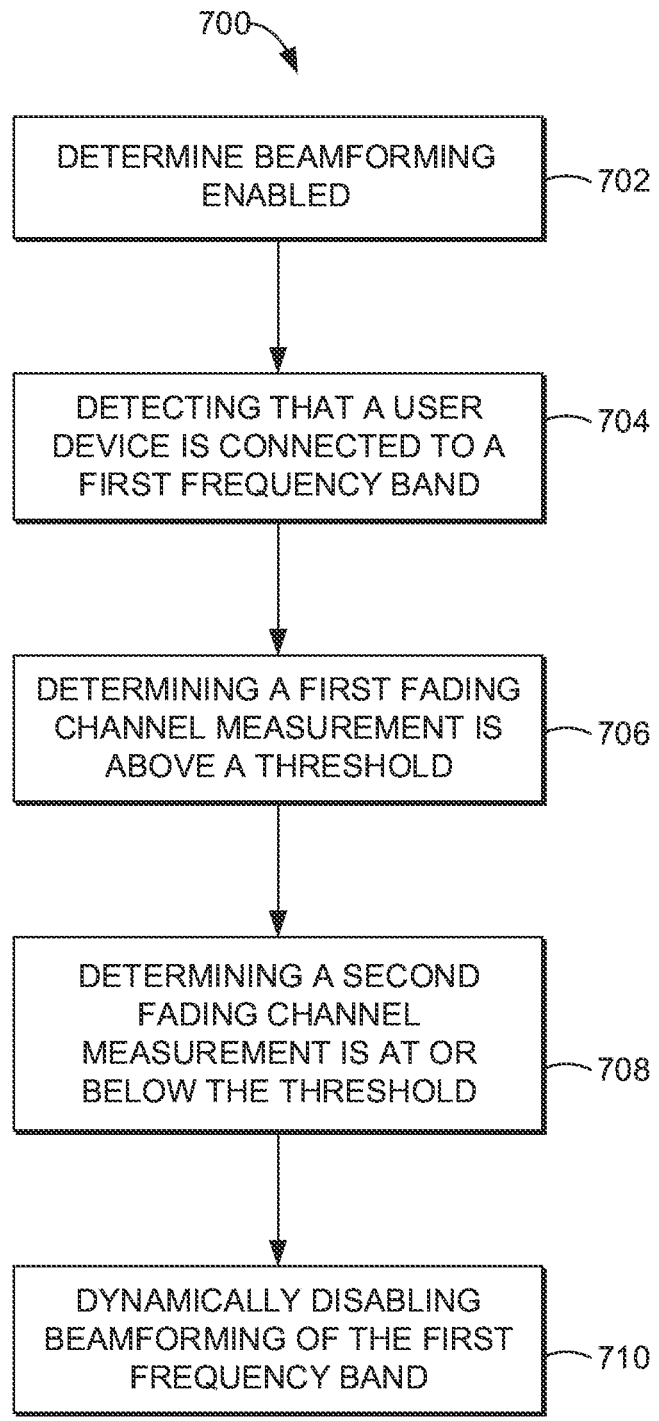
FIG. 7 illustrates an example flowchart in which implementations of the present disclosure may be employed.

Turning now to FIG. 7, flow diagram 700 comprises block 702, wherein a first frequency band and a second frequency band are determined to have beamforming enabled. At block 704, a user device is detected to be connected to the first frequency band for access to a wireless telecommunications network. At block 706, a first fading channel measurement of the first frequency band is determined, and it is also determined that the first fading channel measurement is above a threshold. In some embodiments, the first fading channel measurement comprises a measurement of a rapidity of fading in beam power corresponding to the first frequency band. In some embodiments, the threshold is predetermined based on a channel state information report. Continuing the example, the channel state information report may be generated at regular intervals of time based on a predetermined reporting rate. In another embodiment, the first fading channel measurement may include a measurement of fast fading. In yet another embodiment, the first fading channel measurement may be determined based on a Rayleigh fading model or a Rician fading model.

At block 708, a second fading channel measurement of the second frequency band may be determined, and it may be determined that the second fading channel measurement is at or below the threshold. In some embodiments, the first fading channel measurement and the second fading channel measurement comprise a filtration of noise prior to measurement. In some embodiments, the first fading channel measurement and the second fading channel measurement comprise a measurement of an average duration of how long a signal spends above the threshold. In some embodiments, prior to determining the first fading channel measurement and the second fading channel measurement, a detection is made that a second user device is connected to the first frequency band for access to the wireless telecommunications network. In some embodiments, the first fading channel measurement and the second fading channel measurement are determined based on a time varying channel model. Further, at block 710, in response to determining the first fading channel measurement and the second fading channel measurement, beamforming of the first frequency band is dynamically disabled. In some embodiments, the user device may be dynamically connected to the second frequency band.

Figure 8:
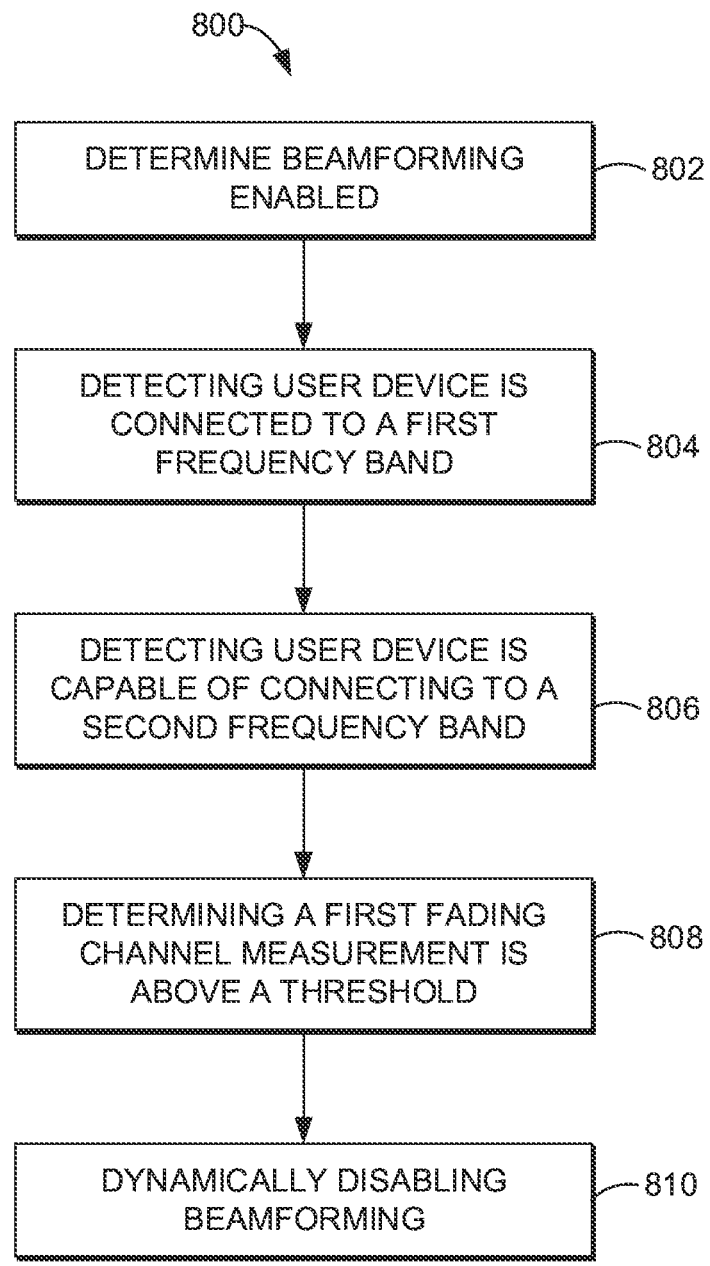
FIG. 8 illustrates an example flowchart in which implementations of the present disclosure may be employed.

Turning now to FIG. 8, flow diagram 800 comprises block 802, wherein it is determined that a first frequency band has beamforming enabled. At block 804, it is detected that a user device is connected to the first frequency band for access to a wireless telecommunications network. At block 806, it is determined that the user device is capable of connecting to a second frequency band having a higher frequency band than the first frequency band. At 808, it is determined that a first fading channel measurement of the first frequency band and that it is above a threshold. At 810, in response to determining the first fading channel measurement, beamforming of the first frequency band is dynamically disabled. In some embodiments, the user device is dynamically connected to the second frequency band for access to the wireless telecommunications network.

Many different arrangements of the various components depicted, as well as components not shown, are possible without departing from the scope of the claims below. Embodiments of our technology have been described with the intent to be illustrative rather than restrictive. Alternative embodiments will become apparent to readers of this disclosure after and because of reading it. Alternative means of implementing the aforementioned can be completed without departing from the scope of the claims below. Certain features and subcombinations are of utility and may be employed without reference to other features and subcombinations and are contemplated within the scope of the claims.

The invention claimed is:

1. A system for dynamically disabling beamforming functionality of a first frequency band, the system comprising:
one or more nodes, each of the one or more nodes configured to wirelessly communicate with a user device in a geographic service area; and
one or more processors configured to perform operations comprising:
detect that the user device is connected to the first frequency band for access to a wireless telecommunications network;
determine that a first fading channel measurement of the first frequency band is above a threshold; and
based on determining that the first fading channel measurement is above the threshold, dynamically disable beamforming of the first frequency band.

2. The system of claim 1, the operations further comprising:
dynamically connect the user device to a second frequency band that has a second fading channel measurement at or below the threshold.

3. The system of claim 1, wherein the first fading channel measurement corresponds to a Multiple Input Multiple Output (MIMO) multipath fading channel.

4. The system of claim 1, wherein the first fading channel measurement is based on a fading average power and a fading amplitude.

5. The system of claim 1, further comprising:
identify a plurality of available frequency bands that the user device is capable of connecting to;
determine that a second fading channel measurement of a second frequency band of the plurality of available frequency bands is a lowest fading channel measurement compared to fading channel measurements of the plurality of available frequency bands and the first fading channel measurement; and
dynamically connect the user device to the second frequency band based on the lowest fading channel measurement.

6. The system of claim 1, further comprising:
receive fading information from a plurality of user devices, each of the plurality of user devices being connected to at least one of a plurality of frequency bands;
determine a fading channel measurement for each of the plurality of frequency bands based on receiving the fading information; and
dynamically disable beamforming of one of the plurality of frequency bands based on a corresponding fading channel measurement being above the threshold.

7. The system of claim 1, the operations further comprising:
determine a second frequency band is beamforming enabled and has a second fading channel measurement at or below the threshold; and
dynamically connect the user device to the second frequency band for access to the wireless telecommunications network.

8. One or more non-transitory computer-readable media having computer-executable instructions embodied thereon that, when executed, perform a method for dynamically disabling beamforming functionality of a first frequency band, the method comprising:
receiving fading information from a user device connected to the first frequency band for access to a wireless telecommunications network;

determining that the fading information corresponding to the first frequency band is above a threshold; and based on determining that the fading information is above the threshold, dynamically disabling beamforming of the first frequency band.

9. The one or more non-transitory computer-readable media of claim 8, further comprising:

determining that the user device is capable of connecting to a second frequency band; and dynamically connecting the user device to the second frequency band based on determining that the user device is capable of connecting to the second frequency band.

10. The one or more non-transitory computer-readable media of claim 9, further comprising:

receiving fading information for the second frequency band from a second user device; and based on receiving the fading information for the second frequency band, determining that a fading channel measurement of the second frequency band is below the threshold, wherein the user device is dynamically connected to the second frequency band based on the fading channel measurement being below the threshold.

11. The one or more non-transitory computer-readable media of claim 8, wherein the fading information includes signal strength deterioration.

12. The one or more non-transitory computer-readable media of claim 8, wherein the fading information comprises a receiver type associated with the user device.

13. The one or more non-transitory computer-readable media of claim 8, wherein the threshold is determined based on a location of the user device and a frequency of the first frequency band.

14. The one or more non-transitory computer-readable media of claim 13, wherein the threshold is determined based on a type of Multiple Input Multiple Output (MIMO) system associated with the first frequency band and antenna elements transmitting the first frequency band.

15. A method for dynamically disabling beamforming functionality of a first frequency band, the method comprising:

detecting that the first frequency band and a second frequency band have beamforming enabled;

determining that a first fading channel measurement of the first frequency band is higher than a second fading channel measurement of the second frequency band; and based on determining that the first fading channel measurement is higher, dynamically disabling beamforming of the first frequency band.

16. The method of claim 15, further comprising:

determining that a user device connected with the first frequency band is capable of connecting to the second frequency band; and dynamically connecting the user device to the second frequency band for access to a wireless telecommunications network based on the second fading channel measurement of the second frequency band.

17. The method of claim 16, wherein the second fading channel measurement is below a threshold.

18. The method of claim 15, wherein dynamically disabling beamforming of the first frequency band comprises adjusting a beam weight from full-power broadcast beamforming to a less than full-power broadcast beamforming.

19. The method of claim 15, wherein the beamforming of the first frequency band is dynamically disabled based on determining that the first fading channel measurement is above a threshold.

20. The method of claim 15, wherein the first fading channel measurement is based on receiving battery power information from a plurality of user devices, location information from the plurality of user devices, and channel state feedback from the plurality of user devices.

* * * * *